US007716206B2

(12) United States Patent
Aaron

(10) Patent No.: US 7,716,206 B2
(45) Date of Patent: May 11, 2010

(54) COMMUNICATION NETWORKS AND METHODS AND COMPUTER PROGRAM PRODUCTS FOR PERFORMING SEARCHES THEREON WHILE MAINTAINING USER PRIVACY

(75) Inventor: Jeffrey A. Aaron, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 726 days.

(21) Appl. No.: 10/978,880

(22) Filed: Nov. 1, 2004

(65) Prior Publication Data

US 2006/0106805 A1 May 18, 2006

(51) Int. Cl.
*G06F 17/30* (2006.01)
(52) U.S. Cl. .................. 707/708; 707/713; 707/722
(58) Field of Classification Search .......... 707/3, 707/5, 1, 4, 708; 709/106
See application file for complete search history.

(56) References Cited

U.S. PATENT DOCUMENTS

| 5,495,606 | A | * | 2/1996 | Borden et al. ............. 707/3 |
|---|---|---|---|---|
| 5,696,962 | A | * | 12/1997 | Kupiec .................... 707/4 |
| 6,029,195 | A | * | 2/2000 | Herz ..................... 725/116 |
| 6,480,885 | B1 | * | 11/2002 | Olivier ................... 709/207 |
| 7,007,275 | B1 | * | 2/2006 | Hanson et al. ............ 718/101 |
| 7,031,960 | B1 | * | 4/2006 | Costin et al. .............. 707/4 |
| 7,213,032 | B2 | * | 5/2007 | Mascarenhas ......... 707/104.1 |
| 2002/0152222 | A1 | * | 10/2002 | Holbrook ............. 707/104.1 |
| 2003/0187835 | A1 | * | 10/2003 | Huret ...................... 707/3 |
| 2004/0054666 | A1 | * | 3/2004 | Lapir et al. ................ 707/3 |
| 2005/0071741 | A1 | * | 3/2005 | Acharya et al. .......... 715/500 |

* cited by examiner

*Primary Examiner*—Shahid A Alam
*Assistant Examiner*—Noosha Arjomandi
(74) *Attorney, Agent, or Firm*—Myers Bigel Sibley & Sajovec, P.A.

(57) ABSTRACT

A communication network is operated by associating a pseudonym with a user of the communication network at a proxy searcher. A complex search request from the user is received at the proxy searcher, the complex search request being associated with the pseudonym. The complex search request and pseudonym are forwarded from the proxy searcher to a central searcher. The complex search request is divided into a plurality of simple search requests at the central searcher. The plurality of simple search requests are performed on at least one database. The results of the plurality of simple search requests are provided to the proxy searcher, the results being associated with the pseudonym.

18 Claims, 3 Drawing Sheets

COMMUNICATION NETWORKS AND METHODS AND COMPUTER PROGRAM PRODUCTS FOR PERFORMING SEARCHES THEREON WHILE MAINTAINING USER PRIVACY

FIELD OF THE INVENTION

The present invention relates to communication networks and methods of operating the same, and, more particularly, to performing media searches on a communication network.

BACKGROUND OF THE INVENTION

Communications networks are widely used for nationwide and worldwide communication of voice, multimedia and/or data. As used herein, communications networks include public communications networks, such as the Public Switched Telephone Network (PSTN), terrestrial and/or satellite cellular networks and/or the Internet.

The Internet is a decentralized network of computers that can communicate with one another via Internet Protocol (IP). The Internet includes the World Wide Web (WWW) service facility, which is a client/server-based facility that includes a large number of servers (computers connected to the Internet) on which Web pages or files reside, as well as clients (Web browsers), which interface users with the Web pages. The topology of the World Wide Web can be described as a network of networks, with providers of network services called Network Service Providers, or NSPs. Servers that provide application-layer services may be referred to as Application Service Providers (ASPs). Sometimes a single service provider provides both functions.

With digital data including media, such as audio and video, being provided in the form of a variety of new services to customers (e.g., MP3 song downloads, movies on demand, multimedia file access, digital-rights-controlled data), customers may wish to actively search for, browse, and locate the data/audio/video they wish to obtain according to their various specifications and desires. Customers, however, are increasingly concerned with privacy, including the information that may be collected during the browsing and/or searching process. This may especially be the case when the searches are complex and contain much information. Browsing and searching can be enhanced via features that allow detailed inclusion and/or exclusion of material in the browse/search range because this may help customers more easily and quickly find what they want. Unfortunately, this may aggravate privacy concerns due to the increased detail of information that may be collected. Currently, customers may rely on service providers promises or policies regarding limitations on how collected information may be used. These promises and/or policies may be confusing and/or insufficient, however.

SUMMARY OF THE INVENTION

According to some embodiments of the present invention, a communication network is operated by associating a pseudonym with a user of the communication network at a proxy searcher. A complex search request from the user is received at the proxy searcher, the complex search request being associated with the pseudonym. The complex search request and pseudonym are forwarded from the proxy searcher to a central searcher. The complex search request is divided into a plurality of simple search requests at the central searcher. The plurality of simple search requests is performed on at least one database. The results of the plurality of simple search requests are provided to the proxy searcher, the results being associated with the pseudonym.

In other embodiments, associating the pseudonym comprises hashing identification information of the user to generate the pseudonym.

In still other embodiments, hashing identification information comprises hashing identification information of the user with salt data to generate the pseudonym.

In still other embodiments, the complex search request comprises a complex search request matrix, the complex search request matrix comprising a first matrix dimension corresponding to general search categories and a second matrix dimension corresponding to sub-categories of the general search categories.

In still other embodiments, performing the plurality of simple search requests comprises performing searches on the at least one database for non-null entries in the complex search request matrix.

In still other embodiments, rules are provided for evaluating whether a search result satisfies respective simple search requests corresponding to non-null entries in the complex search request matrix.

In still other embodiments, providing results of the plurality of simple search requests comprises applying the rules to results of the searches on the at least one database for each non-null entry in the complex search request matrix so as to generate a results matrix having respective result indicators corresponding to each cell of the complex search matrix. The result indicators comprises a binary indicator and/or a numerical indicator having a specified range of values indicating a degree to which a search result satisfied the search request.

In still other embodiments, results are tracked from each of the at least one database by category and/or sub-category and a determination is made of which of the at least one database provides satisfactory results for the respective categories and/or sub-categories.

In still other embodiments, tracking results from each of the at least one database comprises tracking a number of satisfactory results in a given time period; tracking a number of satisfactory results in a set of time periods; tracking a weighted number of satisfactory results in a set of time periods; tracking a rate of change of satisfactory results in a given time period; tracking a rate of change of satisfactory results in a set of time periods; tracking a weighted rate of change of satisfactory results in a set of time periods.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

Figure 1:
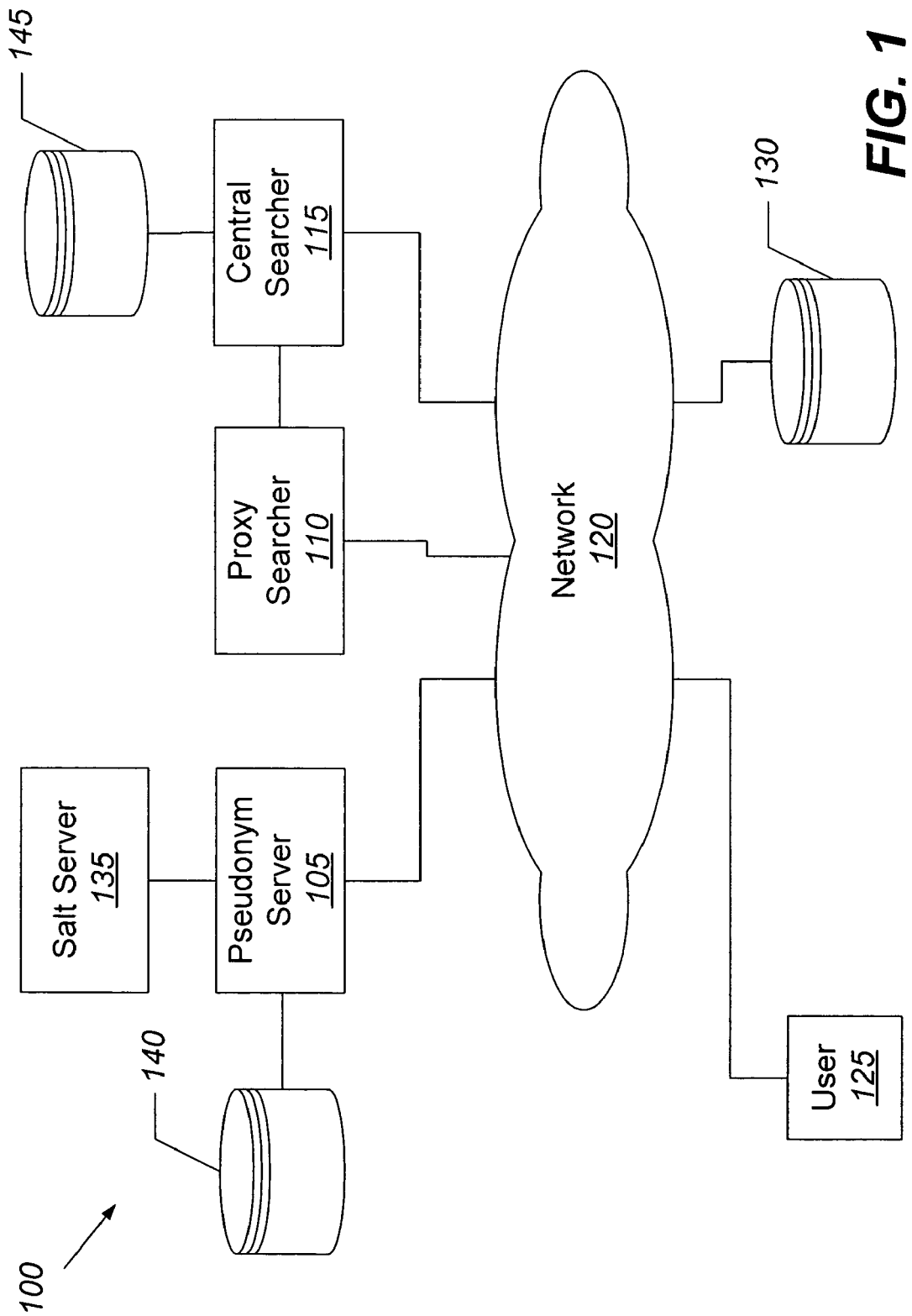
FIG. 1 is a block diagram that illustrates a communication network in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Referring now to FIG. 1, an exemplary network architecture 100 for performing searches on a network while maintaining user privacy, in accordance with some embodiments of the present invention, comprises a pseudonym server 105, a proxy searcher 110, and a central searcher 115 that are connected to a network 120 as shown. A user 125 and one or more databases 130 as also connected to the network 120. The databases 130 may include any sort of searchable entity, including Internet search engines, search services, databases embedded in or as part of another entity or service, and/or traditional databases The user 125 may wish to perform searches on the one or more databases 130, and/or searches that can be associated in some fashion with one or more databases 130 as described below. A salt server 135 along with a server database 140 are connected to the pseudonym server 105. A searcher database 145 is connected to the central searcher 115 to facilitate searches of the one or more databases 130. The network 120 may represent a global network, such as the Internet, or other publicly accessible network. The network 120 may also, however, represent a wide area network, a local area network, an Intranet, or other private network, which may not be accessible by the general public. Furthermore, the network 120 may represent a combination of public and private networks or a virtual private network (VPN).

The proxy searcher 110 and the central searcher 115 may be configured to perform searches of the one or more databases 130 while maintaining the privacy of the user 125. The proxy searcher 110 may cooperate with the pseudonym server 105 to obtain a pseudonym for the user 125 when the user 125 signs up for adaptive, privacy-guaranteed searching provided by the proxy searcher 110 and central searcher 115. Optionally, the proxy searcher 110 may provide the user 125 with a private key that can be used by the user 125 to reduce the risk of impersonation via well-known public-private cryptographic mechanisms for authentication/authorization/encryption/digital signature.

The pseudonym server 105 may be configured to generate a pseudonym for the user 125 using conventional hash algorithms, such as the Secure Hash Algorithm (SHA-1), and/or the various Message Digest (MD2, MD4, MD5) algorithms. To ensure uniqueness of the generated pseudonym, the pseudonym server 105 may use the salt server 135 to provide a "salt," which may be random data that can be used in the hash algorithm. The user's 125 pseudonym may be stored in the server database 140 and provided to the proxy searcher when the proxy searcher receives a search request from the user 125. The pseudonym server 105 may store the user's 125 pseudonym in the database server 140, but may store the user's 125 actual identity separately (e.g., in different portions of the same database 140 or in a different database) to protect the user's 125 privacy.

Thus, according to some embodiments of the present invention, the privacy of the user 125 may be protected by using a three-steps-removed approach to performing a search of the one or more databases 130. First, the central searcher 115 does not see the identity of the user 125, but instead sees a pseudonym for the user 125. Second, the one or more databases 130 do not see the identity of the user 125, but instead see only the central searcher 115. Third, the central searcher 115 breaks up a complex search request received from the proxy searcher 110 into apparently unrelated simple search requests, which may be difficult for an intruder to associate together.

Although FIG. 1 illustrates an exemplary communication network, it will be understood that the present invention is not limited to such configurations, but is intended to encompass any configuration capable of carrying out the operations described herein.

Figure 2:
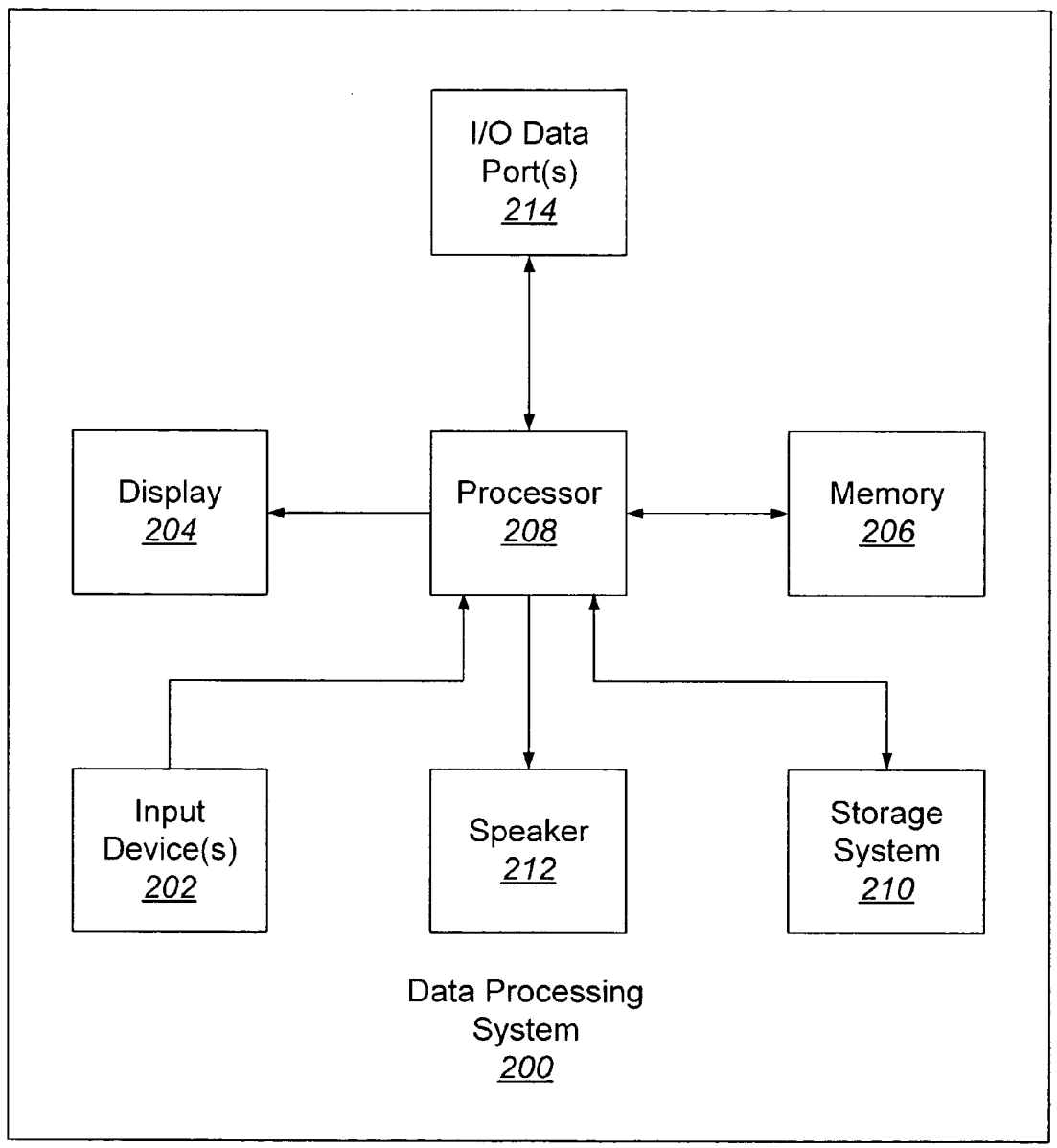
FIG. 2 illustrates a data processing system that may be used to implement various servers of the communication network of FIG. 1 in accordance with some embodiments of the present invention.

Referring now to FIG. 2, a data processing system 200 that may be used to implement the pseudonym server 105, salt server 135, proxy searcher 110, central searcher 115, and/or user 125 of FIG. 1, in accordance with some embodiments of the present invention, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components such as those used in many conventional computing devices, which may be configured to operate as described herein.

Computer program code for carrying out operations of data processing systems discussed above with respect to FIGS. 1 and 2 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary operations for performing searches on a communication network while maintaining user privacy will now be described with reference to FIGS. 3 and 1. Operations begin at block 300 where the pseudonym server 105 associates a pseudonym with the user 125 and stores the pseudonym in the database 140. At block 305, the proxy searcher 110 receives a complex search request for the one or more databases 130.

In accordance with some embodiments of the present invention, the complex search request may be in the form of a matrix where one matrix dimension corresponds to general search categories and the other matrix dimension corresponds to sub-categories of the general search categories. The matrix may use typical general search categories. For example, with respect to movies, the general search categories may include actor or musician name, producer, director, production company, studio, date or period of production, release date, content rating, and/or genre of film. In addition, the matrix may include sub-categories for more detailed searches. For example, mood, e.g., happy, sad, silly, funny, scary, etc. may be a sub-category. A general self-help category may include several sub-categories, such as woodworking, concrete, plumbing, electrical, automotive, etc. The matrix may also use mathematical rules for evaluating searches. For example, one entry in the matrix may represent a search for a movie with at least 10 majestic scenes and less than 15 comedy or sad scenes. Alternately, this search could be represented via combining entry values, for example a "majestic scenes" entry having a value of "at least 10" with a "comedy or sad scenes" entry having a value of "less than 15." Other search queries may be used, such as, for example, a search for movies with around 50% scary scenes, 28% silly scenes, and 22% dramatic scenes. Searches may be made using a desirable/undesirable scale where, for example, +10 indicates some aspect is the most desirable and −10 indicates that some aspect is the least desirable. For example, a search could be made for a movie with a +8 comedy rating and a −5 silly rating. Conditional operations may also be applied. For example, a search may be made for "if the movie is a comedy, then is the comedy dramatic."

Returning to FIG. 3, at block 310, the proxy server 110 forwards the complex search request to the central searcher 115 with the pseudonym associated with the user 125 so as to hide the actual identity of the user 125 from the central searcher. The central searcher 115 divides the complex search request into multiple simple search requests at block 315. The simple search requests correspond to individual or combinations of cells of the search request matrix. Individual cells may be used in that this approach may provide the best privacy. Combinations may be selected for better efficiency and/or to match the capabilities/operations of particular databases 130, such as particular Internet search engines. For example, the central searcher may generate simple searches of the one or more databases 130 by proceeding with each category and generating a search for each sub-category entry that is non-null. Each simple search may be given a unique random-appearing identifier that may be placed into the search request and thus echoed in the reply to that request so that the response/result of the simple search can be assoicated with its "parent" complex search and with the particular user. At block 320 the central searcher 115 performs the simple search requests on the one or more databases 130.

Once the simple searches are complete, the central searcher may evaluate the search results based on rules defining whether a search was satisfied and/or successful. In some embodiments, the rules may be applied mathematically to the results to determine whether one or more of the simple searches was successful. The results may be in the form of a binary indicator, e.g., "yes" or "no" or may be numerical indicators having a specified range of values in accordance with various embodiments of the present invention. Thus, at block 325, the central searcher 115 may populate a results matrix for each "hit," e.g., each movie matching request paramters, corresponding to the complex search request matrix that contains the various results of the simple search requests associated with each hit. The central searcher provides these matrices to the proxy searcher 110, which may also present the search results in other formats, such as histograms and/or a hierarchical distribution of the search results. The proxy searcher 110 has access to the user's 125 pseudonym for reporting the results back to the user 125, or allowing the user 125 to access the results, or enabling some combination.

In accordance with some embodiments of the present invention, the searching operations may be adaptive. That is, the central searcher may "learn" which of the databases 130 provide the best results for various types of searches. For example, the central searcher may track the results from each of the databases 130 by category and/or sub-category. The central searcher 115 may then determine which of the databases provides satisfactory results for the various categories and/or sub-categories. In accordance with various embodiments of the present invention, the results may be tracked in the following ways: a number of satisfactory results in a given time period may be tracked; a number of satisfactory results in a set of time periods may be tracked; a weighted number of satisfactory results in a set of time periods may be tracked; a rate of change of satisfactory results in a given time period may be tracked; a rate of change of satisfactory results in a set of time periods may be tracked; and/or a weighted rate of change of satisfactory results in a set of time periods may be tracked.

Figure 3:
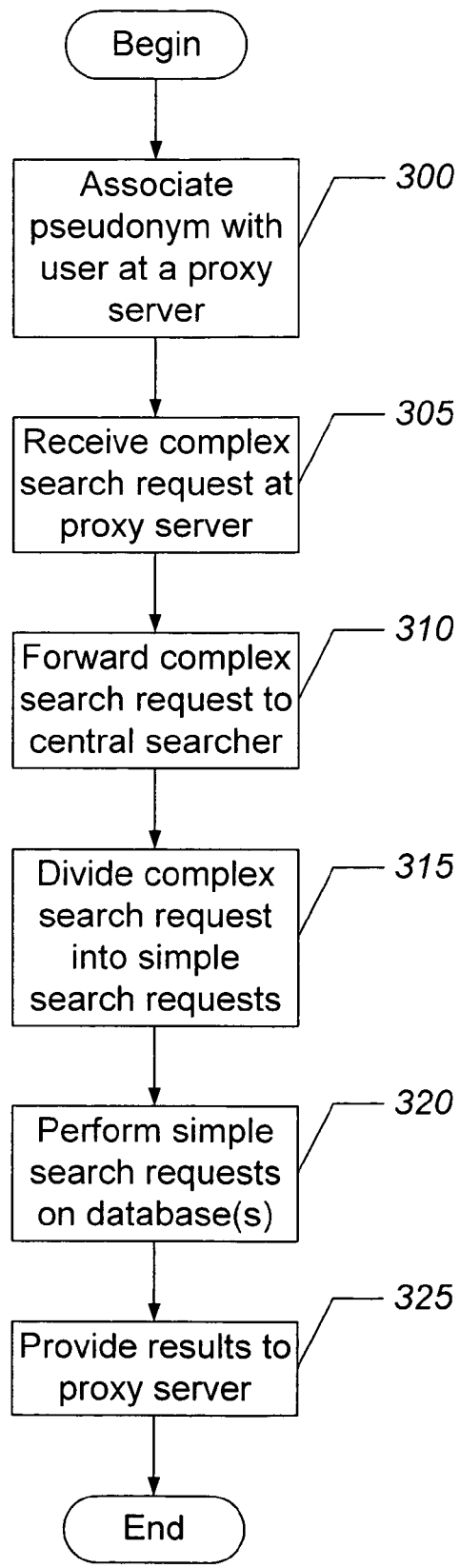
FIG. 3 is a flowchart that illustrates operations of performing searches on a communication network while maintaining user privacy in accordance with some embodiments of the present invention.

The flowchart of FIG. 3 illustrates the architecture, functionality, and operations of some embodiments of methods, communication networks, and computer program products for performing searches on a communication network while maintaining user privacy. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Some embodiments of the present invention may be illustrated by way of example. A customer or user 125 may sign up with an adaptive privacy-guaranteed search service through the proxy searcher 110, for example. The customer 125 decides to search for movies that are happy, romantic, include at least three scenes of sandy beaches, and have actors from a defined actor list that specifies multiple actors in various desirability categories. The request is submitted to the proxy searcher 110, which receives the complex search request matrix formed by the user's software, which may have been previously downloaded from the proxy searcher, for example, when the user signed up for the service. If the user is interacting with the proxy searcher 110 entirely via a web page interface, then the proxy searcher 110 may itself form the complex search request matrix. In any event, the proxy searcher 110 forwards the complex search request matrix along with the customer's 125 pseudonym to the central searcher 115. The central searcher breaks up the complex search request matrix into multiple simple search requests with sequence numbers for internal use and with associated random-appearing identifiers that are placed into the search requests, which are performed on the various databases 130. As the results are received back from the searches, the central searcher 115 combines them back into matrix form for each individual search "hit" and then forwards the results matrices for all of the search hits back to the proxy searcher 110. The proxy searcher may then provide the results matrix to the customer 125 via the customer's 125 pseudonym. The customer 125 may view the results through various software filters to organize the results in a way that is desirable for the customer 125, either via the downloaded software and/or via a proxy server web page capability, and/or some combination.

Many variations and modifications can be made to the embodiments described herein without substantially departing from the principles of the present invention. All such variations and modifications are intended to be included herein within the scope of the present invention, as set forth in the following claims.

That which is claimed:

1. A method of operating a communication network, comprising:
   associating a pseudonym with a user of the communication network at a proxy searcher;
   receiving a complex search request from the user at the proxy searcher, the complex search request being associated with the pseudonym;
   forwarding the complex search request and pseudonym from the proxy searcher to a central searcher;
   dividing the complex search request into a plurality of simple search requests at the central searcher;
   performing the plurality of simple search requests on at least one database; and
   providing results of the plurality of simple search requests to the proxy searcher, the results being associated with the pseudonym;
   wherein the complex search request comprises a complex search request matrix, the complex search request matrix comprising:
   a first matrix dimension corresponding to general search categories; and
   a second matrix dimension corresponding to sub-categories of the general search categories.

2. The method of claim 1, wherein associating the pseudonym comprises:
   hashing identification information of the user to generate the pseudonym.

3. The method of claim 2, wherein hashing identification information comprises:
   hashing identification information of the user with salt data to generate the pseudonym.

4. The method of claim 1, wherein performing the plurality of simple search requests comprises:
   performing searches on the at least one database for non-null entries in the complex search request matrix.

5. The method of claim 4, further comprising:
providing rules for evaluating whether a search result satisfies respective simple search requests corresponding to non-null entries in the complex search request matrix.

6. The method of claim 5, wherein providing results of the plurality of simple search requests comprises:
applying the rules to results of the searches on the at least one database for each non-null entry in the complex search request matrix so as to generate a results matrix having respective result indicators corresponding to each cell of the complex search matrix;
wherein the result indicators comprises a binary indicator and/or a numerical indicator having a specified range of values indicating a degree to which a search result satisfied the search request.

7. The method of claim 1, further comprising:
tracking results from each of the at least one database by category and/or sub-category; and
determining which of the at least one database provides satisfactory results for the respective categories and/or sub-categories.

8. The method of claim 7, wherein tracking results from each of the at least one database comprises:
tracking a number of satisfactory results in a given time period;
tracking a number of satisfactory results in a set of time periods;
tracking a weighted number of satisfactory results in a set of time periods;
tracking a rate of change of satisfactory results in a given time period;
tracking a rate of change of satisfactory results in a set of time periods;
tracking a weighted rate of change of satisfactory results in a set of time periods.

9. A communication network, comprising:
a central searcher;
a pseudonym server that is configured to associate a pseudonym with a user of the communication network; and
a proxy server that is connected to the pseudonym server and the central searcher, the proxy server being configured to receive a complex search request from the user and to forward the complex search request and pseudonym to the central searcher;
wherein the central searcher is configured to divide the complex search request into a plurality of simple search requests, to perform the plurality of search requests on at least one database, and to provide results of the plurality of simple search requests to the proxy searcher such that the results are associated with the pseudonym;
wherein the complex search request comprises a complex search request matrix, the complex search request matrix comprising:
a first matrix dimension corresponding to general search categories; and
a second matrix dimension corresponding to sub-categories of the general search categories; and
wherein the central searcher, the proxy server and the pseudonym server comprise at least one processor running software that implements the central searcher, the proxy server and the pseudonym server.

10. The communication network of claim 9, wherein the pseudonym server is further configured to hash identification information of the user to generate the pseudonym.

11. The communication network of claim 10, wherein the pseudonym server is further configured to hash identification information of the user with salt data to generate the pseudonym.

12. The communication network of claim 9, wherein the central searcher is further configured to perform searches on the at least one database for non-null entries in the complex search request matrix.

13. The communication network of claim 12, wherein the proxy searcher is further configured to provide rules for evaluating whether a search result satisfies respective simple search requests corresponding to non-null entries in the complex search request matrix.

14. The communication network of claim 9, wherein the proxy searcher is configured to track results from each of the at least one database by category and/or sub-category, and to determine which of the at least one database provides satisfactory results for the respective categories and/or sub-categories.

15. A computer program product for operating a communication network, comprising:
a computer readable storage medium having computer readable program code embodied therein, the computer readable program code comprising:
computer readable program code configured to associate a pseudonym with a user of the communication network at a proxy searcher;
computer readable program code configured to receive a complex search request from the user at the proxy searcher, the complex search request being associated with the pseudonym;
computer readable program code configured to forward the complex search request and pseudonym from the proxy searcher to a central searcher;
computer readable program code configured to divide the complex search request into a plurality of simple search requests at the central searcher;
computer readable program code configured to perform the plurality of simple search requests on at least one database; and
computer readable program code configured to provide results of the plurality of simple search requests to the proxy searcher, the results being associated with the pseudonym;
wherein the complex search request comprises a complex search request matrix, the complex search request matrix comprising:
a first matrix dimension corresponding to general search categories; and
a second matrix dimension corresponding to sub-categories of the general search categories.

16. The computer program product of claim 15, further comprising:
computer readable program code configured to perform a search on the at least one database for each non-null entry in the complex search request matrix.

17. The computer program product of claim 16, further comprising:
computer readable program code configured to provide rules for evaluating whether a search result satisfies respective simple search requests corresponding to non-null entries in the complex search request matrix.

18. The computer program product of claim 16, further comprising:
computer readable program code configured to track results from each of the at least one database by category and/or sub-category; and
computer readable program code configured to determine which of the at least one database provides satisfactory results for the respective categories and/or sub-categories.

* * * * *